US012671974B2

(12) United States Patent (10) Patent No.: US 12,671,974 B2

Metzger et al. (45) Date of Patent: Jun. 30, 2026

(54) METHOD FOR PARAMETERIZING A FIELD DEVICE FOR A CONNECTION ESTABLISHMENT

(71) Applicant: VEGA GRIESHABER KG, Wolfach (DE)

(72) Inventors: Manfred Metzger, Haslach im Kinzigtal (DE); Christian Hoferer, Offenburg (DE); Dominik Fehrenbach, Rottweil (DE)

(73) Assignee: VEGA GRIESHABER KG, Wolfach (DE)

( * ) Notice: Subject to any disclaimer, the term of this patent is extended or adjusted under 35 U.S.C. 154(b) by 689 days.

(21) Appl. No.: 17/816,875

(22) Filed: Aug. 2, 2022

(65) Prior Publication Data

US 2023/0030027 A1 Feb. 2, 2023

(30) Foreign Application Priority Data

Aug. 2, 2021 (EP) ..................................... 21189118

(51) Int. Cl.
H04W 8/18 (2009.01)
H04W 4/38 (2018.01)
H04W 76/10 (2018.01)
(52) U.S. Cl.
CPC ............. *H04W 8/183* (2013.01); *H04W 4/38* (2018.02); *H04W 76/10* (2018.02)
(58) Field of Classification Search
CPC ....... H04W 8/183; H04W 4/38; H04W 76/10; G05B 19/0423
See application file for complete search history.

(56) References Cited

U.S. PATENT DOCUMENTS

| | | | |
|---|---|---|---|
| 10,187,784 B1 * | 1/2019 | Chen ..................... | H04L 67/306 |
| 2012/0302284 A1 * | 11/2012 | Rishy-Maharaj ..... | H04W 12/04 |
| | | | 455/552.1 |
| 2015/0058480 A1 | 2/2015 | Allgaier et al. | |
| 2016/0269891 A1 * | 9/2016 | Chen ..................... | H04W 76/18 |
| 2017/0075343 A1 * | 3/2017 | Hansen .............. | G05B 19/4185 |
| 2020/0012249 A1 | 1/2020 | Altendorf et al. | |
| 2021/0195392 A1 * | 6/2021 | Kojima ............. | H04M 15/8038 |
| 2021/0250430 A1 * | 8/2021 | Moon ................... | H04M 1/026 |

FOREIGN PATENT DOCUMENTS

| | | |
|---|---|---|
| DE | 10 2013 216 501 A1 | 2/2015 |
| DE | 10 2017 104 912 A1 | 9/2018 |

OTHER PUBLICATIONS

Extended European Search Report issued Jan. 31, 2022 in European Patent Application No. 21189118.9, 7 pages.

* cited by examiner

*Primary Examiner* — Yemane Mesfin

(74) *Attorney, Agent, or Firm* — Oblon, McClelland, Maier & Neustadt, L.L.P.

(57) ABSTRACT

A field device having an integrated first chip card with a first set of parameters and an interface to a replaceable second chip card. The interface is arranged to receive a second set of parameters from the second chip card. The field device is arranged to establish a connection to a cloud service using the first and/or second set of parameters.

11 Claims, 2 Drawing Sheets

METHOD FOR PARAMETERIZING A FIELD DEVICE FOR A CONNECTION ESTABLISHMENT

CROSS-REFERENCE TO RELATED APPLICATIONS

This application claims the benefit of the filing date of European Patent Application No. 21 189 118.9 filed on 2 Aug. 2021, the entire content of which is incorporated herein by reference.

TECHNICAL AREA

The disclosure relates to a field device, a method for parameterizing a field device to establish a connection, and a use of a first chip card and a second chip card in a field device to establish a connection to an IoT service.

BACKGROUND

Industrial sensors or field devices may have an internally installed SIM card. This SIM card is set to the corresponding remote station (cloud service) and thus cannot be adapted by a user.

SUMMARY

There may be a desire to provide an improved field device with respect to the connection to an IoT service.

This desire is met by the objects of the independent patent claims. Advantageous embodiments are the subject of the dependent claims, the following description, and the figures.

The described embodiments similarly relate to the field device, the method for parameterizing a field device for a connection setup, and the use of a first chip card and a second chip card in a field device to establish a connection. Synergistic effects may result from various combinations of the embodiments, although they may not be described in detail.

It should also be noted that all embodiments of the present disclosure involving a process may be carried out in the order of steps described, but this need not be the sole and essential order of the steps of the process. The methods disclosed herein may be carried out with a different order of the disclosed steps without departing from the particular method embodiment, unless otherwise expressly stated below.

According to a first aspect, a field device is provided which comprises an integrated first chip card with a first set of parameters and an interface to a second chip card, in particular a second chip card that may be exchangeable, is provided. The interface is arranged to establish a connection to a cloud service using the second set of parameters if this is possible according to a check, and otherwise to establish a connection to a cloud service using the first set of parameters.

The field device can thus establish a connection to a cloud service via one of two chip cards in order to send or receive, for example, data, control commands, or configurations, etc. that are typical for field devices. In order to establish the connection, user data or access data such as addresses, providers and so-called credentials, i.e., access data, etc. are required, each of which is stored as a set of parameters on the chip cards. The first and the second set of parameters can now be intentionally different. The field device can then give preference to the second set of parameters from the second chip card, which is provided by a user, for establishing the connection. Through this, it is possible, for example, that the user can use a rate that is favorable to him. Furthermore, it is possible that the field device cannot use the second set of parameters for certain reasons, so that it uses the first chip card or the set of parameters of the first chip card for establishing the connection. For this purpose, the field device checks whether a connection setup is possible or not. The check can be performed before the connection is established and/or during the connection establishment. The test criteria and methods are explained below.

The connection is, for example, an IOT connection to a cloud service that is set up on a server in the cloud. The cloud service and the server are implemented, for example, in an application, a so-called "app", on, for example, a smartphone, PC, laptop or other device connected to the Internet. Such an app may, for example, display the sensor data or manage the sensor. For example, the app can parameterize the sensor through the IoT cloud service implemented there.

The integrated first chip card and/or the second chip card is, for example, a classic plug-in SIM card, a mountable SIM card or a mountable eSIM.

A combination is also possible, e.g., an eSIM and a classic SIM card.

The field device is, for example, a level meter, a point level sensor, a pressure gauge, or a flow meter. The field device can also be a replaceable retrofit module (accessory) with two SIM cards, such as a PLICSCOM module.

It can be provided that the field device is supplied with power via a 4-20 mA loop. The power supply of the field device and/or the accessory can be provided by internal batteries, accumulators or the current loop.

According to an embodiment, the field device comprises the second chip card.

The chip card can be plugged into the field device, so that the interface has mechanical contact to the second chip card and is galvanically connected to it, or it is separated from the field device, but is still defined as part of the field device. In the cases without galvanic connection with the interface, the connection with it can also be wireless, regardless of whether it is plugged in or not.

According to an embodiment, the first set of parameters is access-protected, and the second set of parameters is customizable by a user.

In other words, the first set of parameters is a pre-installed set of parameters that the user cannot access and change, whereas the second set of parameters is a set of parameters provided to the field device by the user. In this case, the set of parameters or the second chip card may have been provided to the set of parameters by a network provider on behalf of the user.

The term "customizable" is to be understood broadly in this context. It means, for example, that the second set of parameters can be made available to the field device by the user, e.g., by inserting the second chip card into the field device, thus enabling the interface to receive this set of parameters, or that the second set of parameters can be changed so that the second set of parameters is a user-defined set of parameters. "Changing the set of parameters" can be understood to mean both changing the values of predetermined parameters and adding or deleting a parameter. The second set of parameters is customizable by a user via the exchangeable second chip card, for example via NFC, Bluetooth and/or APP.

The user can thus store the second set of parameters on the second chip card via a wireless connection or, for example, by inserting it into a card slot of, for example, a cell phone or other device that has write access to the chip card. In both cases, an app or user program can serve as the HMI (human machine interface).

According to an embodiment, the field device comprises a control unit arranged to check the second set of parameters for completeness and/or correctness, and to establish a connection to the cloud service using the second set of parameters if the check is positive, or using the first set of parameters if the check is negative.

The set of parameters can contain parameters that are necessary for establishing a connection and parameters that are not necessary. Complete" is understood here as the minimum set of parameters that is necessary for a successful connection setup. The check for correctness can be, for example, a plausibility check or a check of a valid value range. The completeness and the correctness do not guarantee that the connection establishment will actually be successful, but they are necessary conditions for this. The field device will thus start the connection setup with the second set of parameters on the second chip card if these necessary conditions are met and with the first set of parameters on the first chip card if these necessary conditions are not met.

According to an embodiment, the control unit is arranged to check whether the connection setup to the cloud service using the second set of parameters was successful, and to establish the connection using the first set of parameters if the check was negative.

This means that the first set of parameters is reverted to if the connection with the second set of parameters was not successful. The first set of parameters is, for example, a factory-set set of parameters that guarantees a successful connection if there are no general network errors. The first set of parameters is therefore protected so that it cannot be changed by the user, but only by personnel authorized for this purpose, e.g. the manufacturer or the sales company. This ensures that a connection can always be established; either one way or the other. The first set of parameters serves as a fallback position, so to speak, if the second set of parameters does not work for establishing the connection.

According to an embodiment, the control unit is set up to overwrite the first set of parameters with parameters of the second set of parameters if the connection setup with the second set of parameters was successful.

Thus, the control unit itself is authorized to change the first set of parameters. However, it will only do this if it can ensure that the overwriting parameters, i.e., the second set of parameters, has been successfully used to establish a connection, i.e., a connection could be established with it on a trial basis, and data could possibly also be transmitted via it. This makes it possible for the user to change the second set of parameters a second time, e.g., if he can obtain better technical or contractual conditions for this.

This option takes place after checking the second set of parameters for completeness and correctness, but can in principle also be applied without such a previous check.

According to an embodiment, the control unit is set up to overwrite the second set of parameters with parameters of the first set of parameters when the connection setup with the first set of parameters has taken place.

If the connection with the first set of parameters has taken place, this means that the connection with the second set of parameters was not successful. If this was detected by the control unit and a connection was then successfully established with the first set of parameters, the second set of parameters is discarded or overwritten with the first set of parameters.

According to an embodiment, the field device is a level and/or limit sensor, a pressure sensor, or a flow meter.

The field device may further be an actuator or control unit in the industrial automation or industrial process environment, or may be another industrial sensor type.

According to an embodiment, the first and/or the second chip card is a SIM card for a cellular connection.

This is to be understood as the first chip card being a SIM card, independent of the second chip card, or vice versa, or both chip cards being SIM cards for a mobile connection. In the case that they are not SIM cards, they could for example be simple memory cards or memory cards with functionality.

The fixed SIM card is in particular an eSIM (embedded SIM) card. In the case of an eSIM card, for example, the network operator can transfer the set of parameters, also called the eSIM profile in this context, to the embedded eSIM and it can be used immediately. Transferring can also overwrite a previous profile.

According to an embodiment, parameters of the first and second set of parameters are access parameters for connection establishment, such as to a cellular network, a data network, and/or a cloud service.

The access parameters can be necessary parameters for an IoT connection in particular. Such parameters are, for example, the name of the access point (AccessPointName), user (User) and password (Password). The control unit checks whether this data has been set and is correct. Further parameters can be set on the IoT sensor directly by on-site operation and/or by operation using a cloud service.

According to a further aspect, there is provided a method for parameterizing a field device for connection establishment comprising an integrated first chip card having a first set of parameters, and an interface to a replaceable second chip card having a second set of parameters, comprising the steps of: receiving the second set of parameters from the second chip card through the interface, establishing a connection to a cloud service using the second set of parameters if possible; and otherwise establishing a connection to the cloud service using the first set of parameters.

The steps of the method correspond to the configuration of the field device. Therefore, for the description of the method steps, reference is made to the description of the field device as well as to the description of the figures.

According to an embodiment of the method, the field device further comprises a control unit, and the method further comprises the steps of: Verifying, by the control unit, the completeness and/or correctness of the second set of parameters; and using the second set of parameters to establish the connection if the second set of parameters is complete and/or correct.

"Complete" here also includes the case that the second set of parameters is present at all, i.e., also that the interface with the second interface is wirelessly or galvanically connected to that of the second chip card and can successfully receive the second set of parameters.

According to an embodiment, the method further comprises the steps of: Replacing the second set of parameters with the first set of parameters if the establishment of the connection by the first set of parameters was successful; or Replacing the first set of parameters with the second set of parameters, if the establishment of the connection with the second set of parameters was successful.

Replacing the second set of parameters with the first set of parameters parameterizes the second chip card and replacing the first set of parameters with the second set of parameters parameterizes the first chip card. After the connection to a server or a cloud service has already been established at this point, the parameterization can be performed via the cloud service, for example.

According to another aspect, a use of a first chip card having a first set of parameters and a second chip card having a second set of parameters in a field device for establishing a connection using the first set of parameters or the second set of parameters to a cloud service.

That is, the field device has two sets of parameters available from which the field device, more specifically a control unit of the field device, selects a set of parameters to establish the connection according to the criteria described herein.

BRIEF DESCRIPTION OF THE FIGURES

In the following, embodiments are explained in more detail with reference to the schematic drawings. Here shows FIG. 1 a field device.

Corresponding parts are marked with the same reference signs in all figures.

DETAILED DESCRIPTION OF EMBODIMENTS

Figure 1:
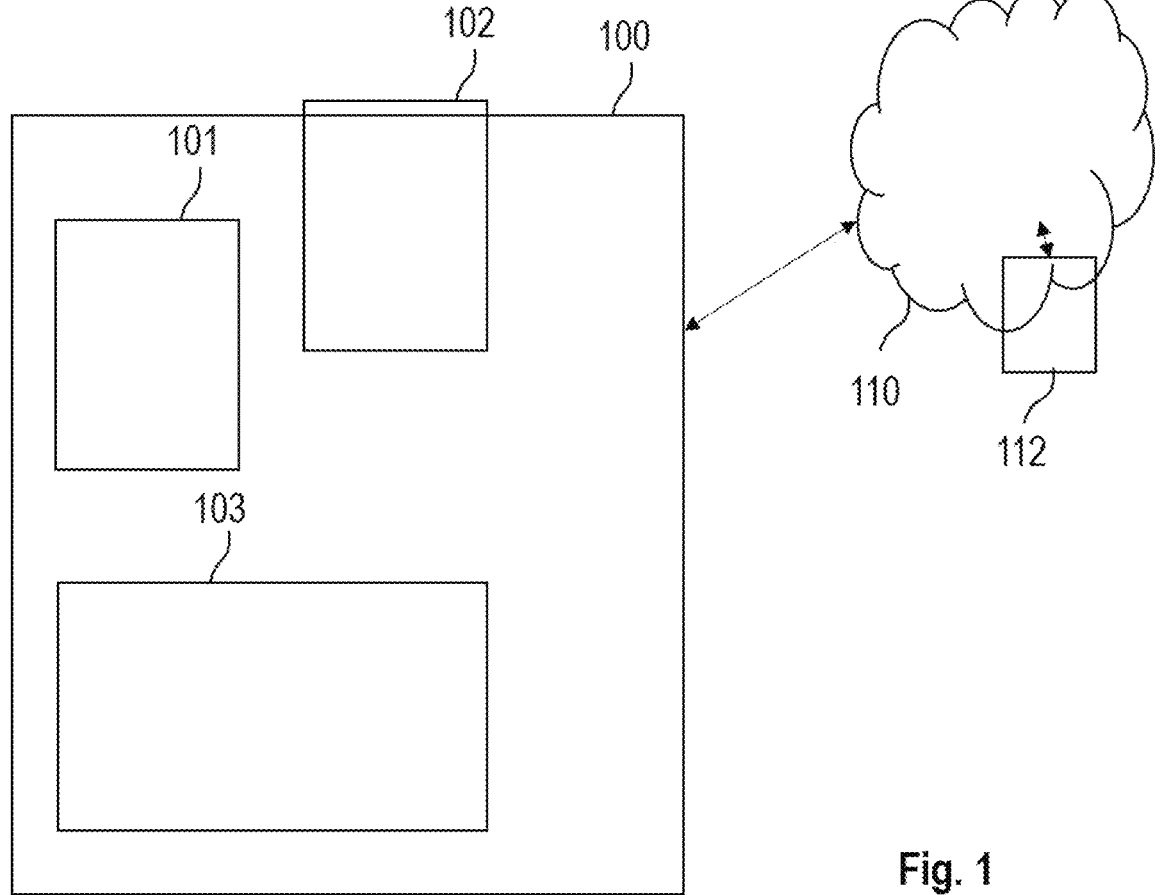

FIG. 1 shows a field device 100, e.g., an IoT sensor 100. The IoT sensor 100 has a first chip card 101, e.g., a SIM card 101, that is permanently installed. A first set of parameters is stored on the first chip card 101. In addition, a second chip card 102, e.g., any SIM card 102 may be inserted. A second set of parameters is stored on the second chip card 102. The field device 100 further comprises a control unit 103.

The first and/or second SIM card 101, 102 can be used, for example, to establish a connection to a cloud service 112, such as an IoT server in the cloud 110. The field device 100 first attempts to establish the connection using the second SIM card 102 with the second set of parameters stored there. If the field device detects or determines that this is not possible, it uses the first chip card 101 with the first set of parameters. The field device may detect this before the connection attempt, or during the connection attempt.

Access to the first set of parameters is, for example, blocked at the factory for access by a user. The customer can change or have changed the second set of parameters on the second SIM card 102, which can be mechanically plugged in or parameterized, e.g., via NFC, Bluetooth, an app via WLAN or Internet, or on site via the first SIM card 101, or mechanically by plugging in the second SIM card 102, which already contains the second set of parameters. Entering the parameters necessary for establishing a connection is possible both directly at the IoT sensor 100 by on-site operation and by operation using a cloud service. However, especially in the case of operation by means of a cloud service, it may happen that the necessary parameters are not entered correctly, so that the connection to the IoT sensor is lost. The procedure described in FIG. 2 ensures that a connection to the IoT service can be established if the sensor is to be operated via the IoT service.

Figure 2:
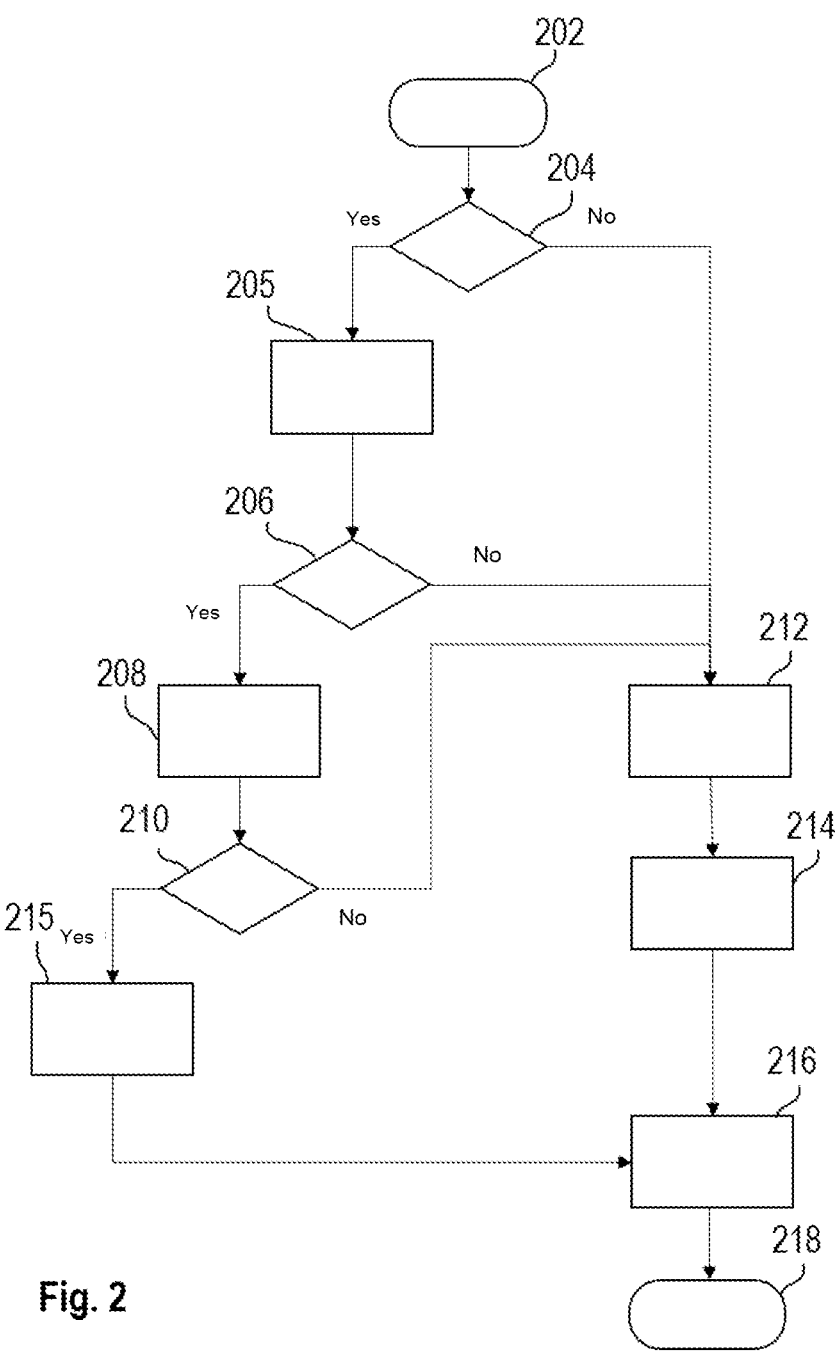
FIG. 2 a flowchart of a method for parameterizing the field device.

FIG. 2 shows a flowchart of a method for parameterizing a field device 100 to establish a connection to a cloud service 112. After start 202, the inserted SIM card 102 is detected 204 by the control unit 103, i.e., checked whether it is present. If so, the control unit 103 receives the second set of parameters in 205 and checks in 206 whether all necessary parameters such as AccessPointName, User and Password have been set. If so, in 208 the second set of parameters is used to establish a connection to the cloud service 112, e.g., on a cloud server or app. In 210, it is checked whether the connection establishment was successful. If so, the first chip card 101 is co-parameterized 215 with the second set of parameters by, for example, a cloud service, and the measurement data can be sent in 216. Finally, in 218 the procedure is finished. If the checks in 204, 206 or 210 are negative, the first set of parameters is used in 212 to establish a connection to the cloud service 112, the second chip card 102 is parameterized with the set of parameters of the first chip card 101 in 214, and then the process proceeds to the step 216 of sending measurement data.

Thus, a method is proposed that detects failed connections and in which, after one or more unsuccessful attempts to establish a connection, the IoT sensor 100 reverts to the fixed SIM card 101. This procedure thus ensures that the IoT sensor 100 is never "lost". By using a dedicated SIM card 102, the user can use existing mobile phone contracts and, if necessary, avoid roaming charges.

Other variations of the disclosed embodiments may be understood and carried out by those skilled in the art in carrying out the claimed invention by studying the drawings, the disclosure, and the appended claims. In the claims, the word "comprising" does not exclude other elements or steps, and the indefinite article "a" or "one" does not exclude a plurality. A single processor or other unit may perform the functions of multiple items or steps recited in the claims. The mere fact that certain actions are recited in interdependent claims does not mean that a combination of those actions cannot be advantageously used.

The control unit 103 may include logic circuits such as a microprocessor, an FPGA, an ASIC, a CPLD, etc., which may be defined by a computer program. The computer program may be stored/distributed on a suitable medium such as an optical storage medium or a semiconductor medium provided with or as part of other hardware, but may also be distributed in other forms, for example, via the Internet or other wired or wireless telecommunications systems. Reference signs in the claims should not be construed to limit the scope of the claims.

The invention claimed is:

1. A field device, comprising:

an integrated first chip card including a first set of parameters for connecting to a cloud service, wherein the first set of parameters is access-protected;

an interface to a second chip card, the interface being configured to receive a second set of parameters from the second chip card, wherein the second set of parameters is customizable by a user; and control circuitry configured to:

check the second set of parameters for completeness and/or correctness, establish a connection to the cloud service using the second set of parameters when the verification is positive and using the first set of parameters when the verification is negative, wherein the field device is configured to connect to a cloud service using the second set of parameters according to a verification, and wherein when it is not possible to connect to the cloud service using the second set of parameters, the field device is configured to establish a connection to the cloud service using the first set of parameters, and wherein the field device is a level sensor, a pressure sensor, or a flow meter.

2. The field device according to claim 1, further comprising the second chip card.

3. The field device according to claim 1, wherein the control circuitry is further configured to:

verify that the connection establishment to the cloud service using the second set of parameters was successful; and establish the connection using the first set of parameters when the check was unsuccessful.

4. The field device according to claim 1, wherein the control circuitry is further configured to overwrite the first set of parameters with parameters of the second set of parameters when the connection establishment with the second set of parameters was successful.

5. The field device according to claim 1, wherein the control circuitry is further configured to overwrite the second set of parameters with parameters of the first set of parameters when the connection establishment with the first set of parameters has taken place.

6. The field device according to claim 1, wherein the first chip card and/or the second chip card are SIM cards for a mobile radio connection.

7. The field device according to claim 1, wherein parameters in the first and second sets of parameters are access parameters for connection establishment.

8. The field device according to claim 2, wherein the first chip card and/or the second chip card are SIM cards for a mobile radio connection.

9. The field device according to claim 2, wherein parameters in the first and second sets of parameters are access parameters for connection establishment.

10. A method for parameterizing a field device for a connection establishment, the field device including an integrated first chip card with a first set of parameters for connecting to a cloud service, wherein the first set of parameters is access-protected, and an interface to a replaceable second chip card with a second set of parameters, wherein the second set of parameters is customizable by a user, the method comprising:

receiving the second set of parameters from the second chip card through the interface;

establishing a connection to a cloud service using the second set of parameters according to a verification; and when it is not possible to connect to the cloud service using the second set of parameters, establishing a connection to the cloud service using the first set of parameters, wherein the field device is a level sensor, a pressure sensor, or a flow meter, wherein the field device further includes control circuitry, and wherein the method further comprises:

verifying, by the control circuitry, completeness and/or correctness of the second set of parameters, applying the second set of parameters to establish the connection when the second set of parameters is complete and/or correct, replacing the second set of parameters with the first set of parameters when the establishment of the connection by the first set of parameters is successful, and replacing the first set of parameters with the second set of parameters when the establishment of the connection with the second set of parameters was successful.

11. A non-transitory computer readable medium having stored thereon a program that when executed by a processor causes the processor to implement a method for parameterizing a field device for a connection establishment, the field device including an integrated first chip card with a first set of parameters for connecting to a cloud service, wherein the first set of parameters is access-protected and an interface to a replaceable second chip card with a second set of parameters, wherein the second set of parameters is customizable by a user, the method comprising:

receiving the second set of parameters from the second chip card through the interface;

establishing a connection to a cloud service using the second set of parameters according to a verification; and when it is not possible to connect to the cloud service using the second set of parameters, establishing a connection to the cloud service using the first set of parameters, wherein the field device is a level sensor, a pressure sensor, or a flow meter, wherein the field device further includes control circuitry, and wherein the method further comprises:

verifying, by the control circuitry, completeness and/or correctness of the second set of parameters, applying the second set of parameters to establish the connection when the second set of parameters is complete and/or correct, replacing the second set of parameters with the first set of parameters when the establishment of the connection by the first set of parameters is successful, and replacing the first set of parameters with the second set of parameters when the establishment of the connection with the second set of parameters was successful.

* * * * *